United States Patent
Mauzy et al.

(10) Patent No.: US 10,684,406 B2
(45) Date of Patent: Jun. 16, 2020

(54) FLEXIBLE LIGHT GUIDE AND LIGHTING SYSTEM

(71) Applicant: Rockwell Collins, Inc., Cedar Rapids, IA (US)

(72) Inventors: Jameson R. Mauzy, Great Neck, NY (US); Brendan Upton, East Patchogue, NY (US); Christian D. Trapani, East Moriches, NY (US)

(73) Assignee: Rockwell Collins, Inc., Cedar Rapids, IA (US)

(*) Notice: Subject to any disclaimer, the term of this patent is extended or adjusted under 35 U.S.C. 154(b) by 87 days.

(21) Appl. No.: 15/924,063

(22) Filed: Mar. 16, 2018

(65) Prior Publication Data

US 2019/0285792 A1   Sep. 19, 2019

(51) Int. Cl.
*B64D 11/00* (2006.01)
*F21V 8/00* (2006.01)

(52) U.S. Cl.
CPC ............ *G02B 6/0065* (2013.01); *B64D 11/00* (2013.01); *G02B 6/0021* (2013.01); *G02B 6/0041* (2013.01); *G02B 6/0046* (2013.01); *G02B 6/0061* (2013.01); *G02B 6/0088* (2013.01); *B64D 2011/0038* (2013.01); *B64D 2203/00* (2013.01); *G02B 6/002* (2013.01)

(58) Field of Classification Search
CPC .. G02B 6/0065; G02B 6/0021; G02B 6/0041; G02B 6/0046; G02B 6/0061; G02B 6/0088; G02B 6/002; B64D 11/00; B64D 2011/0038; B64D 2203/00; F21V 17/00; F21V 17/10; F21V 19/00; F21V 21/00; F21V 2200/00
See application file for complete search history.

(56) References Cited

U.S. PATENT DOCUMENTS 5,128,842 A * 7/1992 Kenmochi ........... G02B 6/0061
                                                        200/314
8,128,271 B2    3/2012 Nichol
(Continued)

FOREIGN PATENT DOCUMENTS

EP    0904923 A1    3/1999
EP    2389537 A1    11/2011
(Continued)

OTHER PUBLICATIONS

Partial European Search Report dated Jul. 23, 2019 for EP Application No. 19159670.9.
(Continued)

*Primary Examiner* — Bao Q Truong
(74) *Attorney, Agent, or Firm* — Suiter Swantz pc llo

(57) ABSTRACT

In accordance with embodiments of this disclosure a light guide includes a flexible substrate having two outer surfaces with at least one of the two outer surfaces defining a light emitting area. At least one edge of the flexible substrate is configured to receive light from a light source coupled to the edge. The light guide further includes a plurality of light extraction features formed within the flexible substrate in between the two outer surfaces. The light extraction features may be arranged according to a controlled distribution that affects a propagation of light in between the two outer surfaces and an emission of light from the light emitting area.

12 Claims, 16 Drawing Sheets

(56) References Cited

U.S. PATENT DOCUMENTS

| | | | |
|---|---|---|---|
| 8,167,461 B2 | 5/2012 | Nichol | |
| 8,434,909 B2 | 5/2013 | Nichol et al. | |
| 8,714,781 B2 | 5/2014 | Nichol | |
| 8,764,262 B2 | 7/2014 | Nichol et al. | |
| 8,905,610 B2 | 12/2014 | Coleman et al. | |
| 8,917,962 B1 | 12/2014 | Nichol et al. | |
| 8,950,902 B2 | 2/2015 | Coleman et al. | |
| 9,028,123 B2 | 5/2015 | Nichol et al. | |
| 9,103,956 B2 | 8/2015 | Nichol et al. | |
| 9,110,200 B2 | 8/2015 | Nichol et al. | |
| 9,523,807 B2 | 12/2016 | Nichol et al. | |
| 9,557,473 B2 | 1/2017 | Nichol et al. | |
| 9,566,751 B1 | 2/2017 | Nichol et al. | |
| 9,645,304 B2 | 5/2017 | Nichol et al. | |
| 9,651,729 B2 | 5/2017 | Nichol et al. | |
| 9,690,032 B1 | 6/2017 | Nichol et al. | |
| 9,798,075 B2 | 10/2017 | Nichol et al. | |
| 2004/0130912 A1* | 7/2004 | Miyashita | G02B 6/002 362/561 |
| 2008/0043490 A1* | 2/2008 | Coleman | G02B 6/0036 362/623 |
| 2011/0227487 A1 | 9/2011 | Nichol et al. | |
| 2012/0206923 A1 | 8/2012 | Tanaka et al. | |
| 2012/0287665 A1* | 11/2012 | Hyakuta | G02B 6/0043 362/602 |
| 2012/0287674 A1 | 11/2012 | Nichol et al. | |
| 2013/0050831 A1* | 2/2013 | Hu | G02B 6/0041 359/599 |
| 2013/0155723 A1 | 6/2013 | Coleman | |
| 2013/0208508 A1 | 8/2013 | Nichol et al. | |
| 2013/0250618 A1 | 9/2013 | Nichol et al. | |
| 2014/0056028 A1 | 2/2014 | Nichol et al. | |
| 2014/0063853 A1 | 3/2014 | Nichol et al. | |
| 2014/0360578 A1 | 12/2014 | Nichol et al. | |
| 2015/0078035 A1 | 3/2015 | Nichol et al. | |
| 2015/0219834 A1 | 8/2015 | Nichol et al. | |
| 2015/0253487 A1 | 9/2015 | Nichol et al. | |
| 2016/0356945 A1 | 12/2016 | Zhou | |
| 2017/0040306 A1* | 2/2017 | Kim | H01L 25/167 |
| 2017/0045669 A1 | 2/2017 | Nichol et al. | |
| 2017/0205572 A1 | 7/2017 | Nichol et al. | |
| 2017/0235036 A1 | 8/2017 | Nichol et al. | |
| 2017/0285243 A1 | 10/2017 | Nichol et al. | |

FOREIGN PATENT DOCUMENTS

| | | |
|---|---|---|
| EP | 2558775 A2 | 2/2013 |
| EP | 2558776 A2 | 2/2013 |
| EP | 2558893 A4 | 2/2013 |
| EP | 2683980 A1 | 1/2014 |
| EP | 2558776 A4 | 5/2014 |
| EP | 2558775 A4 | 6/2014 |
| EP | 2683980 A4 | 8/2014 |
| EP | 2389537 A4 | 7/2015 |
| EP | 2197649 B1 | 5/2017 |
| WO | 2010085787 A1 | 7/2010 |
| WO | 2011130715 A2 | 10/2011 |
| WO | 2011130715 A3 | 10/2011 |
| WO | 2011130718 A2 | 10/2011 |
| WO | 2011130718 A3 | 10/2011 |
| WO | 2011130720 A2 | 10/2011 |
| WO | 2011130720 A3 | 10/2011 |
| WO | 2012016047 A1 | 2/2012 |
| WO | 2012016047 A4 | 2/2012 |
| WO | 2012016047 A8 | 2/2012 |
| WO | 2012068543 A1 | 5/2012 |
| WO | 2012088315 A1 | 6/2012 |
| WO | 2012122511 A1 | 9/2012 |
| WO | 2012158460 A1 | 11/2012 |
| WO | 2017086880 A1 | 5/2017 |

OTHER PUBLICATIONS

Extended EP Search Report dated Jan. 28, 2020 for EP Patent Application No. 19159670.9.

* cited by examiner

FLEXIBLE LIGHT GUIDE AND LIGHTING SYSTEM

BACKGROUND

Edge lighting may be desirable in an aircraft because, in an edge-lit system, a light source and its associated hardware can be placed in a convenient (out of the way) location while a light guide transmits light from the light source to a light emitting surface. On the other hand, backlit systems require the light source to be positioned directly behind the light emitting surface. This makes installation of backlit systems more complicated. For example, backlit systems may require additional wiring in order to have the light source positioned behind the light emitting surface; or in some cases, it may be impossible to install the light emitting surface at a desired location due to wiring and/or spatial limitations.

Acrylics are often used for edge lighting. However, most acrylics do not meet aviation industry standards because they are too flammable to be used on an aircraft. The next viable option would be polycarbonate, which is inherently flame-retardant. However, polycarbonate has a high transmission loss when light travels through it. This material characteristic of polycarbonate renders it a non-ideal material for a light guide. There is a need for new edge lighting solutions, particularly ones that meet aviation industry standards.

SUMMARY

In one aspect, embodiments of the inventive concepts disclosed herein are directed to a flexible light guide. The flexible light guide comprises a flexible substrate having two outer surfaces with at least one of the two outer surfaces defining a light emitting area. At least one edge of the flexible substrate is configured to receive light from a light source coupled to the edge. The flexible light guide also includes a plurality of light extraction features formed within the flexible substrate in between the two outer surfaces. The light extraction features may be arranged according to a controlled distribution that affects a propagation of light in between the two outer surfaces and an emission of light from the light emitting area.

In a further aspect, embodiments of the inventive concepts disclosed herein are directed to a method of manufacturing a flexible light guide. The method can include casting formation material into a mold and forming a plurality of light extraction features within the formation material. The formation material is then cured to produce a flexible substrate with the plurality of light extraction features embedded within the flexible substrate (e.g., embedded in between two outer surfaces of the flexible substrate). In implementations, the light extraction features formed within the formation material are arranged according to a controlled distribution that affects a propagation of light in between the two outer surfaces the resulting flexible substrate and an emission of light from a light emitting area defined by at least one of the two outer surfaces.

In a further aspect, embodiments of the inventive concepts disclosed herein are directed to a lighting system. The lighting system can include a light source, a light fixture, and a light guide coupled to the light source and the light fixture. In embodiments, the light fixture includes at least one longitudinal support member with first projections and second projections. The first projections are configured to couple the longitudinal support member with a curved support surface. The light guide may be configured to extend along the curved support surface. The light guide comprises a flexible substrate having two outer surfaces. A first outer surface defines a light emitting area, and a second outer surface is coupled to the second projections of the light fixture. The second projections may at least partially extend through the second outer surface of the flexible substrate to couple the flexible substrate to the curved support surface. At least one edge of the flexible substrate is configured to receive light from a light source coupled to the edge. The light guide also includes a plurality of light extraction features formed within the flexible substrate in between the two outer surfaces. The light extraction features may be arranged according to a controlled distribution that affects a propagation of light in between the two outer surfaces and an emission of light from the light emitting area.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
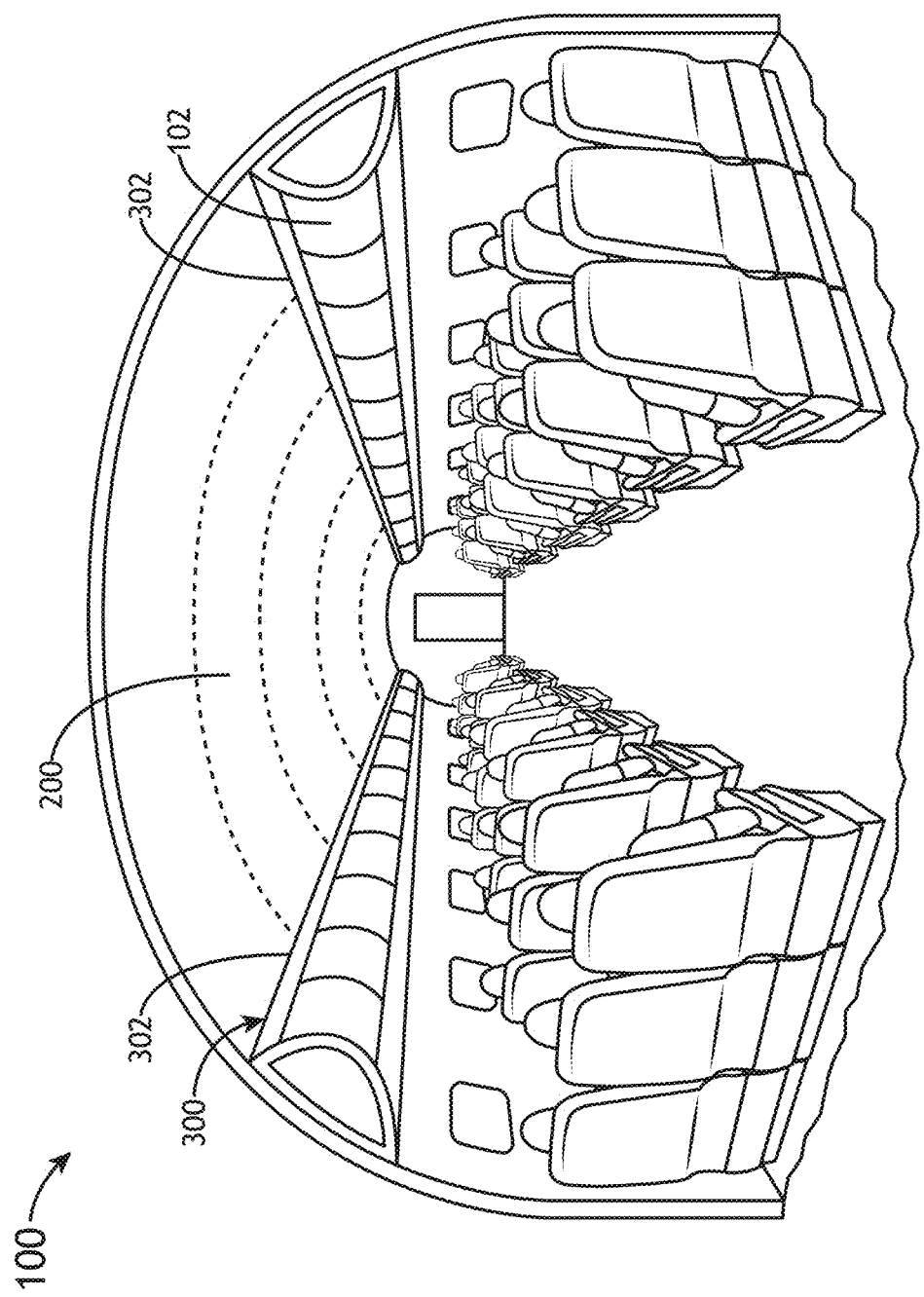
FIG. 1 is an illustration of an aircraft environment in which a lighting system can be implemented in accordance with example embodiments of this disclosure, where the lighting system includes at least one flexible light guide.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to flexible light guides and techniques for manufacturing the same. Embodiments of the inventive concepts herein are also directed to lighting systems that include flexible light guides (e.g., for edge lighting solutions). The light guide structures and systems disclosed herein allow for highly controlled color accuracy and dimming capabilities as well as consistency from lighting panel to panel. The flexibility of the disclosed light guide structures are well-suited for aircraft interiors due to the complex curvatures that currently exist within aircrafts. Furthermore, the light guide structures can be formed from materials that meet aviation industry standards (e.g., fire, smoke, and toxicity requirements). It is also contemplated that the light guide structures and systems disclosed herein can be implemented in other environments (e.g., lighting systems for other types of vehicles, indoor/outdoor lighting systems, etc.).

FIG. 1 illustrates an example embodiment of an aircraft 100 that includes an overhead lighting system (e.g., lighting system 300) with a plurality of flexible light guides 200 configured as panels along an overhead portion 102 of the aircraft 100. The flexible light guides 200 can be coupled to light sources 302 (e.g., LEDs, fluorescent lights, incandescent lights, etc.) disposed on the left side and/or right side of the overhead portion 102 of the aircraft 100. For example, the light sources 302 may include one or more LED strips lining the left side and/or right side of the overhead portion 102 of the aircraft 100. While FIG. 1 illustrates an example embodiment of the lighting system 300 in an aircraft 100, the lighting system 300 is not limited to aircraft installations and may be used in other vehicles (e.g., cars, trains, busses, boats, etc.), buildings, billboards, street signs, and so forth.

Figure 2A:
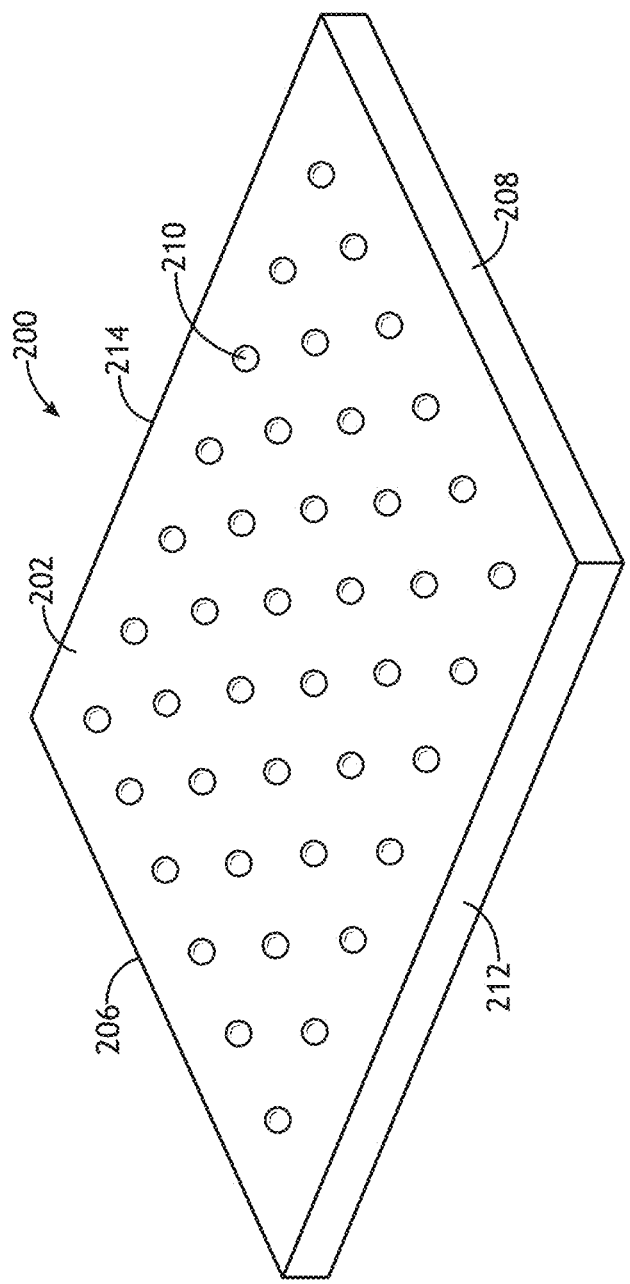
FIG. 2A is a perspective top view of a flexible light guide in accordance with example embodiments of this disclosure.
Figure 2B:
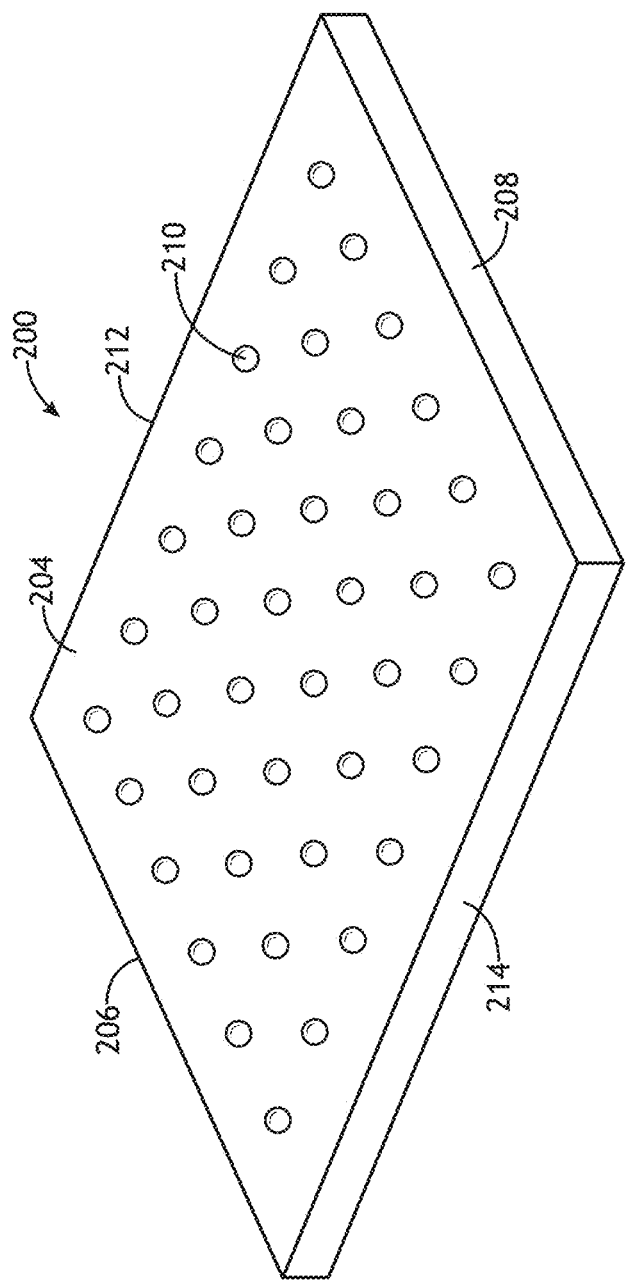
FIG. 2B is a perspective bottom view of a flexible light guide in accordance with example embodiments of this disclosure.
Figure 2C:
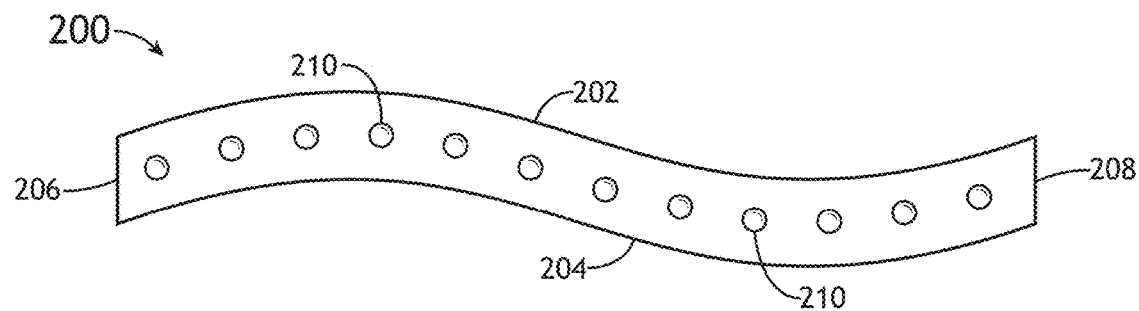
FIG. 2C is a cross-sectional side view of a flexible light guide in accordance with example embodiments of this disclosure.

Referring now to FIGS. 2A through 2C, a flexible light guide 200 comprises a flexible substrate. As used herein, the terms "flexible light guide" and "flexible substrate" are sometimes used interchangeably. It is to be understood that the flexible light guide 200 includes the flexible substrate and may also include additional components (e.g., reflectors, coatings, diffusers, light steering features, etc.) that can be embedded within or coupled to the flexible substrate. The flexible light guide 200 has high transmission characteristics and may be flame-retardant as well. In embodiments, the flexible light guide 200 can be formed from silicon because it has the foregoing characteristics and is also flexible and casts well. In some embodiments, the flexible light guide 200 is formed from an optically clear silicone (e.g., DOW CORNING SYLGARD 184, or the like). The flexible light guide 200 can also be formed other materials or compositions of materials that have similar transmission characteristics and physical properties to the transmission characteristics and physical properties of silicon.

The flexible light guide 200 has at least two outer surfaces. For example, the flexible light guide 200 in FIGS. 2A through 2C has a first outer surface 202 and a second outer surface 204 that is opposite the first outer surface 202. The flexible light guide 200 also has one or more edges surrounding the outer surfaces 202 and 204. For example, in embodiments, the flexible light guide 200 can be rectangular with four edges (e.g., edges 206, 208, 212, and 214) surrounding the outer surfaces 202 and 204. The flexible light guide 200 may have any number of edges. For example, in other embodiments, the flexible light guide 200 can be another polygonal prism (e.g., triangular prism, pentagonal prism, etc.) with more or less edges, a circular or elliptical prism with only one edge surrounding the two outer surfaces 202 and 204, or a complex shape with a combination of straight and curved edges (e.g., such as the flexible light guide 200 shown in FIG. 11).

At least one of the two outer surfaces 202 and 204 defines a light emitting area. For example, the first surface 202 and/or the second surface 204 can be configured to emit at least a portion of light that is propagated through the flexible light guide 200 in between the two outer surfaces 202 and 204. The flexible light guide 200 includes a plurality of light extraction features 210 in between the outer surfaces 202 and 204. In embodiments, the light extraction features 210 include bubbles (e.g., fluid bubbles such as gas (e.g., air) or liquid bubbles) formed in between the outer surfaces 202 and 204. In other embodiments, the light extraction features 210 are formed by a solid or semi-sold (e.g., gel) material embedded within the flexible light guide 200 that has different transmission characteristics than material (e.g., silicon) that makes up the flexible light guide 200. The light extraction features 210 are configured to cause a portion of the light propagating through the flexible light guide 200 to be released from a light emitting area defined by the first surface 202 and/or the second surface 204.

The light extraction features 210 may have a controlled distribution that affects a propagation of light in between the outer surfaces 202 and 204 and an emission of light from the light emitting area (i.e., from the first surface 202 and/or the second surface 204). For example, FIGS. 3 through 8 show embodiments of a lighting system 300 that includes the light guide 200 with its light extraction features 210 in various arrangements that allow for a lower percentage of the light propagating in between the outer surfaces 202 and 204 to emit from portions of the light emitting area near a light source 302 than other portions of the light emitting area that are further from the light source 302. As further described herein, the arrangements of light extraction features 210 illustrated in FIGS. 3 through 8 can achieve uniformity (or near uniformity) of light emissions across the light emitting area because regions of the light guide 200 that are further from the light source 302 will have less total light propagating in between the outer surfaces 202 and 204 than the regions that are near the light source 302 (e.g., due transmission losses and/or light emissions near the light source 302). Thus, the regions of the light guide 200 that are further from the light source 302 must emit a higher percentage of the remaining light in order to have a same or similar emission of photons as the regions that are closer to the light source 302.

The flexible light guide 200 is configured to receive light from a light source 302 that is coupled to at least one edge of the flexible light guide 200. In the example embodiment shown in FIG. 3, a lighting system 300 is shown to include a light source 302 coupled to an edge 206 of the flexible light guide 200. To maintain internal reflection of light within the light guide 200, a reflector 216 may be disposed upon at least a portion of the other edges (e.g., edge 208, edge 212, and/or edge 214) and/or other portions of edge 206 that are not coupled to the light source 302. For example, the reflector 216 can be a reflective coating, reflective tape, and/or other reflective structure that is applied, adhered, or otherwise disposed upon edge 208, edge 212, edge 214, and/or other surfaces of the flexible light guide 200 that are not configured to receive or emit light. In embodiments, the first outer surface 202 may be fully or partially covered by a reflector 216, while the second outer surface 204 defines the light emitting area of the flexible light guide 200, or vice versa. In some embodiments, the first outer surface 202 and the second outer surface 204 both define light emitting areas (e.g., where there is no reflector 216 covering either of the outer surfaces 202 or 204). In other embodiments, the first outer surface 202 and/or the second outer surface 204 are partially covered. For example, one or both of the outer surfaces 202 and 204 can be partially covered by a respective reflector 216 so that the outer surface 202/204 is configured to partially define a light emitting area.

Figure 3:
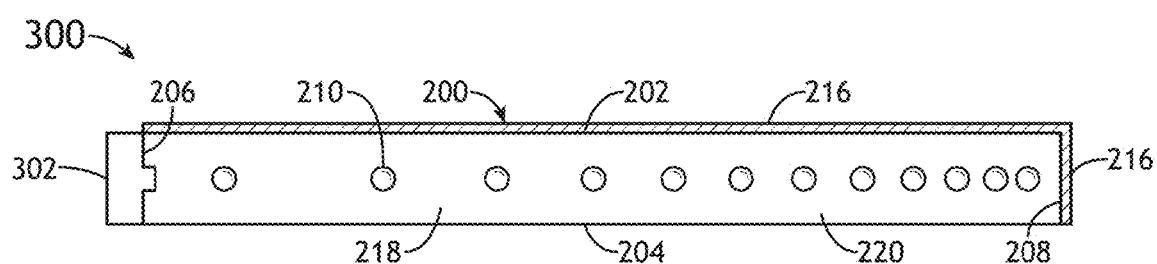
FIG. 3 is a cross-sectional side view of a lighting system that includes a flexible light guide in accordance with example embodiments of this disclosure.
Figure 7:
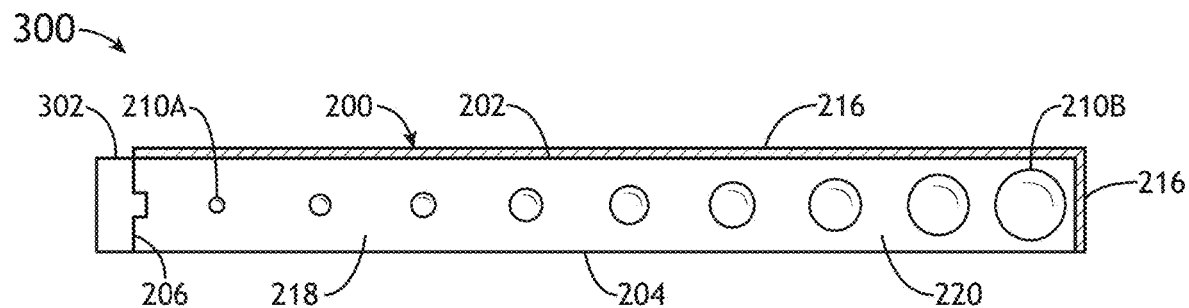
FIG. 7 is a cross-sectional side view of a lighting system that includes a flexible light guide in accordance with example embodiments of this disclosure.

In the embodiment shown in FIG. 3, the light extraction features 210 are arranged according to a non-uniform distribution. For example, a first region 218 of the flexible light guide 200 has less light extraction features 210 (or a lower density of light extraction features 210) than a second region 220 of the flexible light guide 200. The first region 218 is closer to the light source 302 than the second region 220, and the light guide 200 will therefore have more light propagating through the first region 218 than the second region 220 at any given time. Consequently, the first region 218 does not need to emit as high of a percentage of the light in order to produce the same light emissions as the second region 220. In some embodiments, instead of varying the number or density of light extraction features in regions of the flexible light guide 200, the volume or size of the light extraction features can be varied throughout different regions of the flexible light guide 200. FIG. 7 shows an example embodiment of the light guide 200 with smaller light extraction features 210 in the first region 218 than in the second region 220. For example, a light extraction feature 210A in the first region 218 that is close to the light source 302 may be smaller than a light extraction feature 210B in the second region 220 that is further from the light source 302. In other embodiments, a combination of varying sizes of light extraction features 210 and number/density of light extraction features 210 in a region can be used to control the propagation of light between the outer surfaces 202 and 204 and/or the emission of light from the light emitting area defined by the first outer surface 202 and/or the second outer surface 204.

Figure 4:
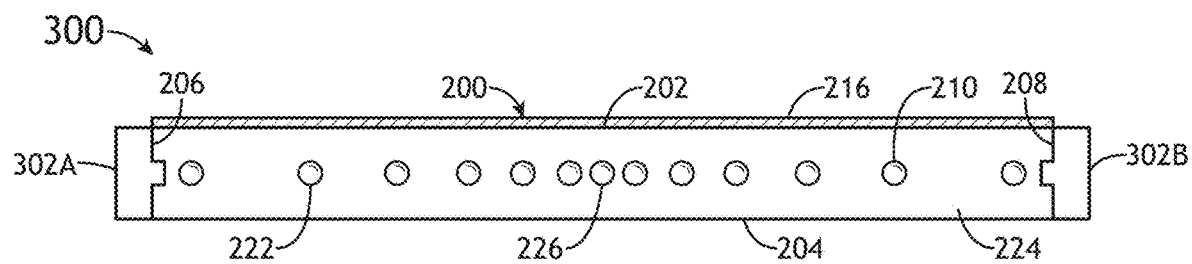
FIG. 4 is a cross-sectional side view of a lighting system that includes a flexible light guide in accordance with example embodiments of this disclosure.

As shown in FIG. 4, the lighting system 300 may include a plurality of light sources 302. For example, a first light source 302A can be coupled to one edge 206 of the flexible light guide 200, and a second light source 302B can be coupled to another edge 208 of the flexible light guide 200. To maintain internal reflection of light within the light guide 200, a reflector 216 may be disposed upon at least a portion of the other edges (e.g., edge 212 and/or edge 214) and/or other portions of the light guide 200 that are not coupled to the light sources 302. For example, the reflector 216 can be a reflective coating, reflective tape, and/or other reflective structure that is applied, adhered, or otherwise disposed upon edge 212, edge 214, and/or other surfaces of the flexible light guide 200 that are not configured to receive or emit light. In embodiments, the first outer surface 202 may be fully or partially covered by a reflector 216, while the second outer surface 204 defines the light emitting area of the flexible light guide 200, or vice versa. In some embodiments, the first outer surface 202 and the second outer surface 204 both define light emitting areas (e.g., where there is no reflector 216 covering either of the outer surfaces 202 or 204). In other embodiments, the first outer surface 202 and/or the second outer surface 204 are partially covered. For example, one or both of the outer surfaces 202 and 204 can be partially covered by a respective reflector 216 so that the outer surface 202/204 is configured to partially define a light emitting area.

Figure 8:
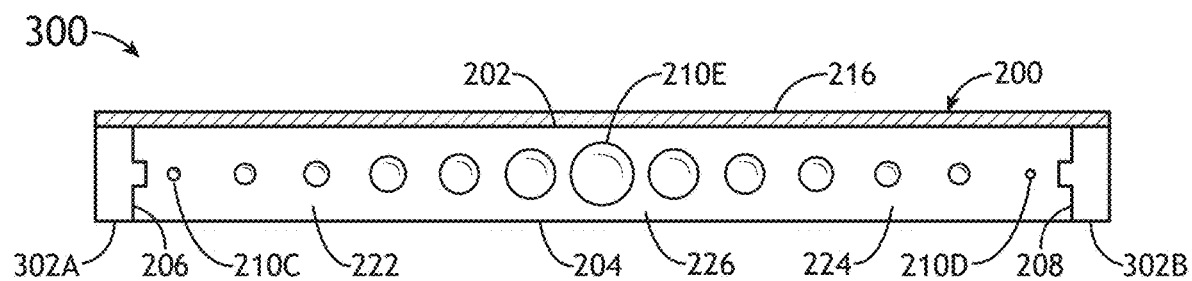
FIG. 8 is a cross-sectional side view of a lighting system that includes a flexible light guide in accordance with example embodiments of this disclosure.

In the embodiment shown in FIG. 4, the light extraction features 210 are also arranged according to a non-uniform distribution. For example, edge regions 222 and 224 of the flexible light guide 200 have less light extraction features 210 (or a lower density of light extraction features 210) than an inner region 226 of the flexible light guide 200. The edge regions 222 and 224 are closer to the light sources 302 (e.g., the first light source 302A and the second light source 302B, respectively) than the inner region 226, and the light guide 200 will therefore have more light propagating through the edge regions 222 and 224 than the inner region 226 at any given time. Consequently, the edge regions 222 and 224 do not need to emit as high of a percentage of the light in order to produce the same light emissions as the inner region 226. In some embodiments, instead of varying the number or density of light extraction features in regions of the flexible light guide 200, the volume or size of the light extraction features can be varied throughout different regions of the flexible light guide 200. FIG. 8 shows an example embodiment of the light guide 200 with smaller light extraction features 210 in the edge regions 222 and 224 than in the inner region 226. For example, light extraction features 210C and 210D in the edge regions 222 and 224 may be smaller than a light extraction feature 210E in the inner region 226 that is further away from the light sources 302 than the edge regions 222 and 224. In other embodiments, a combination of varying sizes of light extraction features 210 and number/density of light extraction features 210 in a region can be used to control the propagation of light between the outer surfaces 202 and 204 and/or the emission of light from the light emitting area defined by the first outer surface 202 and/or the second outer surface 204.

Figure 5:
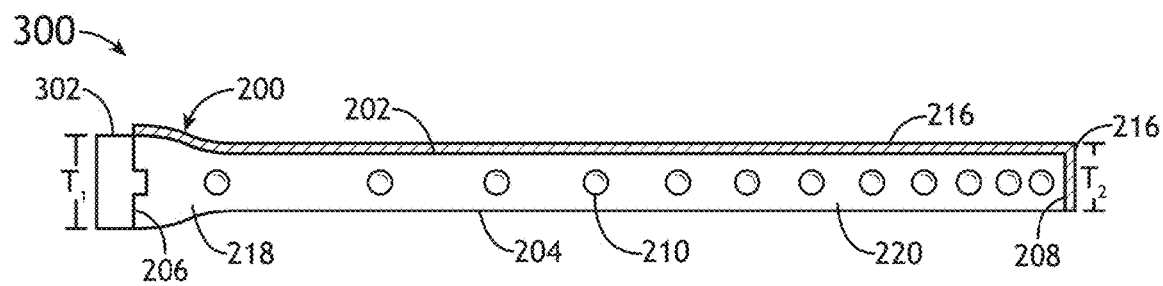
FIG. 5 is a cross-sectional side view of a lighting system that includes a flexible light guide in accordance with example embodiments of this disclosure.
Figure 6:
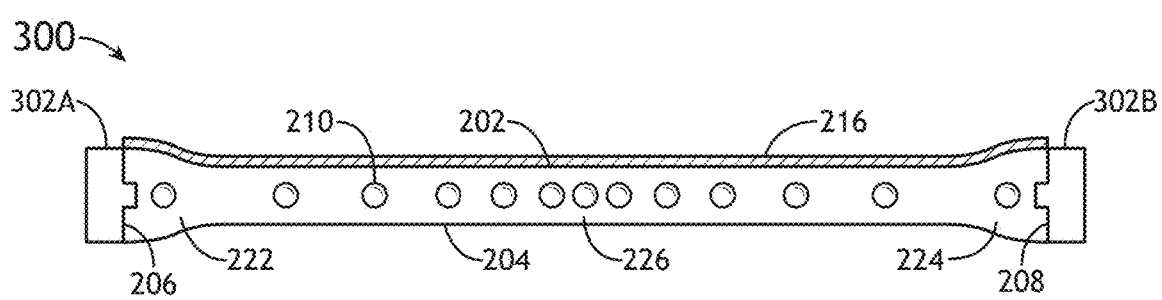
FIG. 6 is a cross-sectional side view of a lighting system that includes a flexible light guide in accordance with example embodiments of this disclosure.

FIGS. 5 and 6 illustrate embodiments of the flexible light guide 200 having a non-uniform thickness. For example, in an embodiment shown in FIG. 5, the edge 206 that is coupled to the light source 302 has a first thickness $T_1$ and an inner portion (e.g., region 220) of the flexible light guide 200 has a second thickness $T_2$ that is less than the first thickness $T_1$. The flexible light guide 200 may be tapered so that the thickness of the flexible light guide 200 gradually decreases from the first thickness $T_1$ to the second thickness $T_2$ over the region 218 of the flexible light guide 200 that is proximate to the edge 206. In the embodiment shown in FIG. 5, the edge 208 that is opposite edge 206 can also have thickness $T_2$. FIG. 6 illustrates another embodiment where the light guide 200 has two edges 206 and 208 that are coupled to respective light sources 302A and 302B, respectively. In such embodiments, the edges 206 and 208 may have greater thicknesses (e.g., thickness $T_1$) than the thickness (e.g., thickness $T_2$) of the inner region 226. The edge regions 222 and 224 can be tapered so that the thickness of the flexible light guide 200 gradually decreases from thickness $T_1$ at the edges 206 and 208 to thickness $T_2$ at the inner region 226. When the flexible light guide 200 is tapered in the manner illustrated in FIGS. 5 and 6, or the like, the flexible light guide 200 can be formed from less material. Having a slimmer form-factor can also provide for reduced space requirements for the lighting system 300 and enhanced aesthetic appearance.

Figure 9:
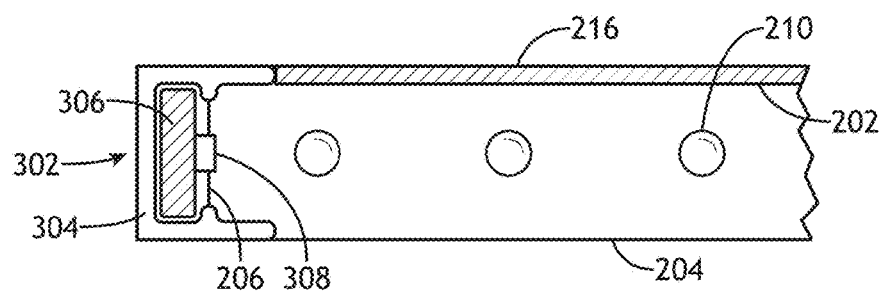
FIG. 9 is a partial cross-sectional side view illustrating a connection between a light source and a flexible light guide in accordance with example embodiments of this disclosure.
Figure 10:
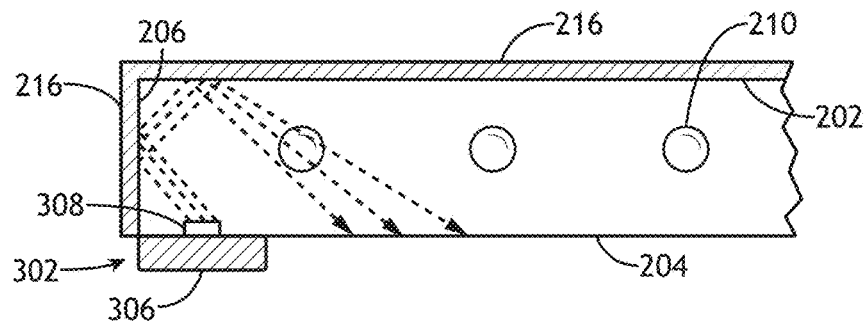
FIG. 10 is a partial cross-sectional side view illustrating a connection between a light source and a flexible light guide in accordance with example embodiments of this disclosure.

The flexible light guide 200 can be coupled to a light source 302 by a variety of different techniques. FIGS. 9 and 10 show example embodiments of the light source 302 coupled to the edge 206 of the flexible light guide 200. The light source 302 may include a support substrate 306 (e.g., a printed circuit board (PCB) or the like) with one or more light elements 308 (e.g., light emitting diodes (LEDs) or the like) disposed upon the support substrate 306. As shown in FIG. 9, the light source 302 can be configured to direct light into the flexible light guide 200 through the edge 206. For example, the light source 302 can be coupled directly to the edge 206 of the flexible light guide 200. In embodiments, the light source 302 includes an edge support structure 304 that is configured to receive at least a portion of the edge 206 within the edge support structure 304 and is further configured to hold the support substrate 306 so that the one or more light elements 308 are pointed at or into the edge 206. FIG. 10 shows another example embodiment where the light source 302 is configured to direct light into the flexible light guide 200 through a portion of the outer surface 204 that is adjacent to the edge 206. In such embodiments, the edge 206 may be covered or coated by a reflector 216 so that the light that is directed into the flexible light guide 200 through the portion of the outer surface 204 can reflect off the edge 206 and propagate towards inner regions of the flexible light guide 200.

It is contemplated that various techniques may be employed to direct light into the flexible light guide 200 at one or more edges (e.g., edges 206, 208, 212, and/or 214) or portions thereof. For example, in other embodiments, the light source 302 itself can include a light guide structure (e.g., fiber optic, acrylic light guide, etc.). In some embodiments, the light source 302 can include another flexible light guide 200. For example, two or more flexible light guides 200 can be daisy chained by placing the flexible light guides 200 edge-to-edge without reflectors 216 covering the interfacing edges. In this manner, two or more flexible light guides 200 can be operable as one larger light guide structure.

In some embodiments, the light source 302 can be integrated within the flexible light guide 200. For example, at least a portion of the light source 302 can be embedded with the flexible light guide 200. The light source 302 may be embedded within the flexible light guide 200 during an injection molding process or by removing a portion of the flexible light guide 200 and inserting at least a portion of the light source 302 in place of the removed portion.

Figure 11:
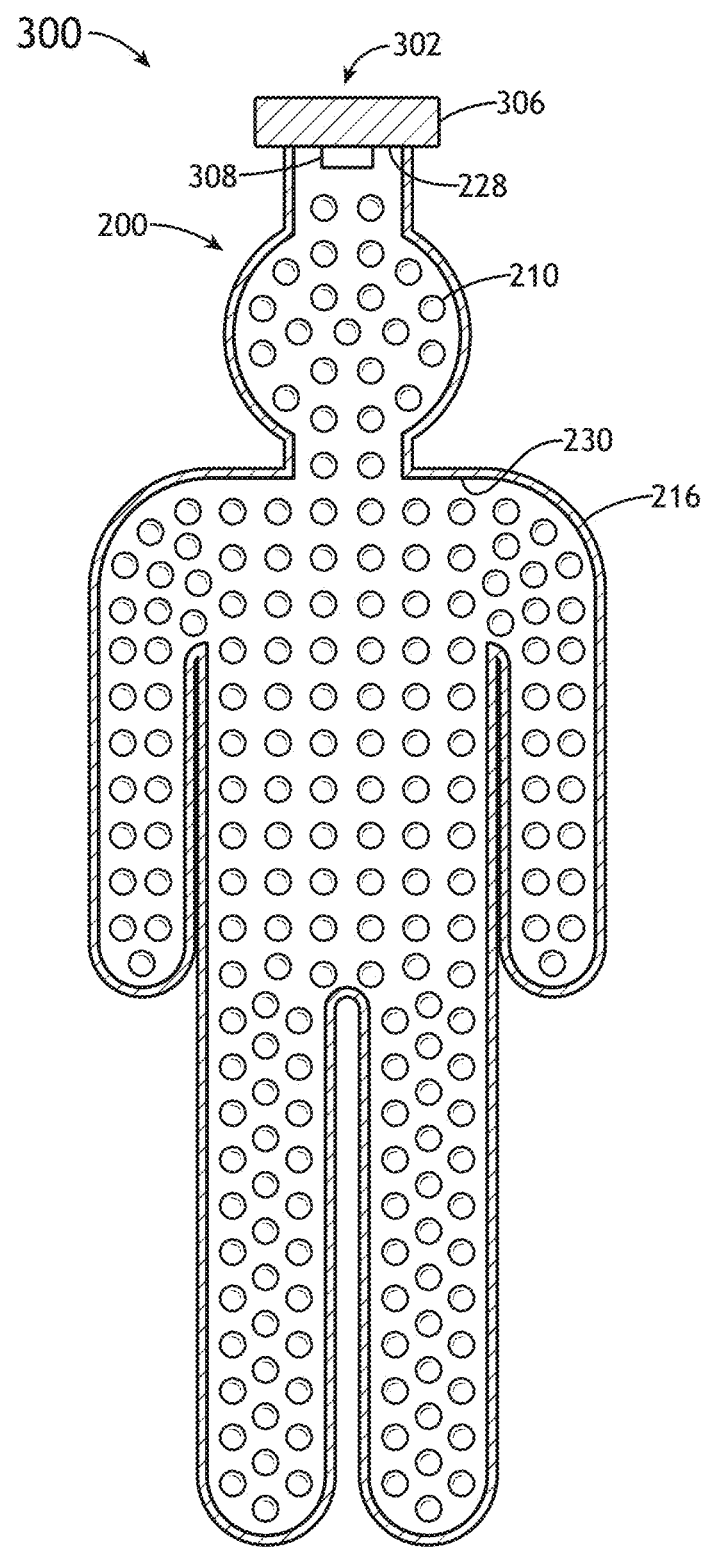
FIG. 11 is a top view of a lighting system that includes a flexible light guide in accordance with example embodiments of this disclosure.

As previously discussed, the flexible light guide 200 can be formed in virtually any shape depending on the lighting application. For example, FIG. 11 shows an embodiment of a lighting system 300 where the flexible light guide 200 is shaped like a person (e.g., for a washroom sign or the like). The flexible light guide 200 in FIG. 11 has an edge 228 coupled to the light source 302 while its other edges or edge regions (e.g., edge 230 and so forth) are covered by reflector 216. In some embodiments, the outer surfaces (e.g., surfaces 202 and 204) of the flexible light guide 200 are both configured to emit light (e.g., no reflector 216 is disposed on either of the surfaces 202 or 204). For example, the flexible light guide 200 may be suspended longitudinally (e.g., as shown in FIG. 11) so both of the outer surfaces 202 and 204 of the flexible light guide 200 by individuals looking from the front or the back. This arrangement can be useful for signage (e.g., washroom signs, exit signs, etc.), emergency lighting applications, decorative lighting, and so forth. In other applications, such as the aircraft lighting application illustrated in FIG. 1, only one of the outer surfaces (e.g., surface 204) is visible when the lighting system 300 is installed and therefore it is more efficient to cover the other outer surface (e.g., surface 202) with a reflector 216 so that most of the light is emitted by the visible outer surface (e.g., surface 204).

Figure 12:
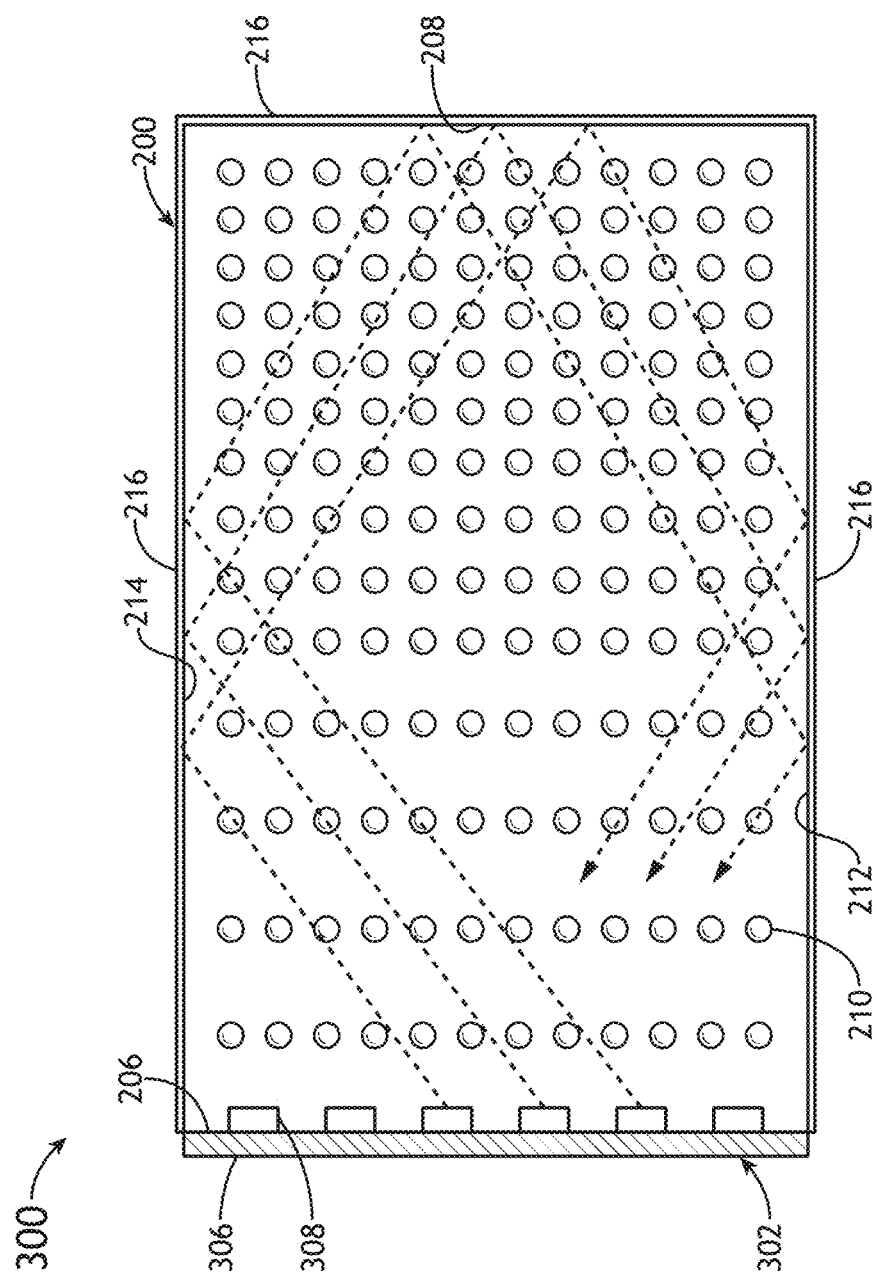
FIG. 12 is a top view of a lighting system that includes a flexible light guide in accordance with example embodiments of this disclosure.
Figure 13:
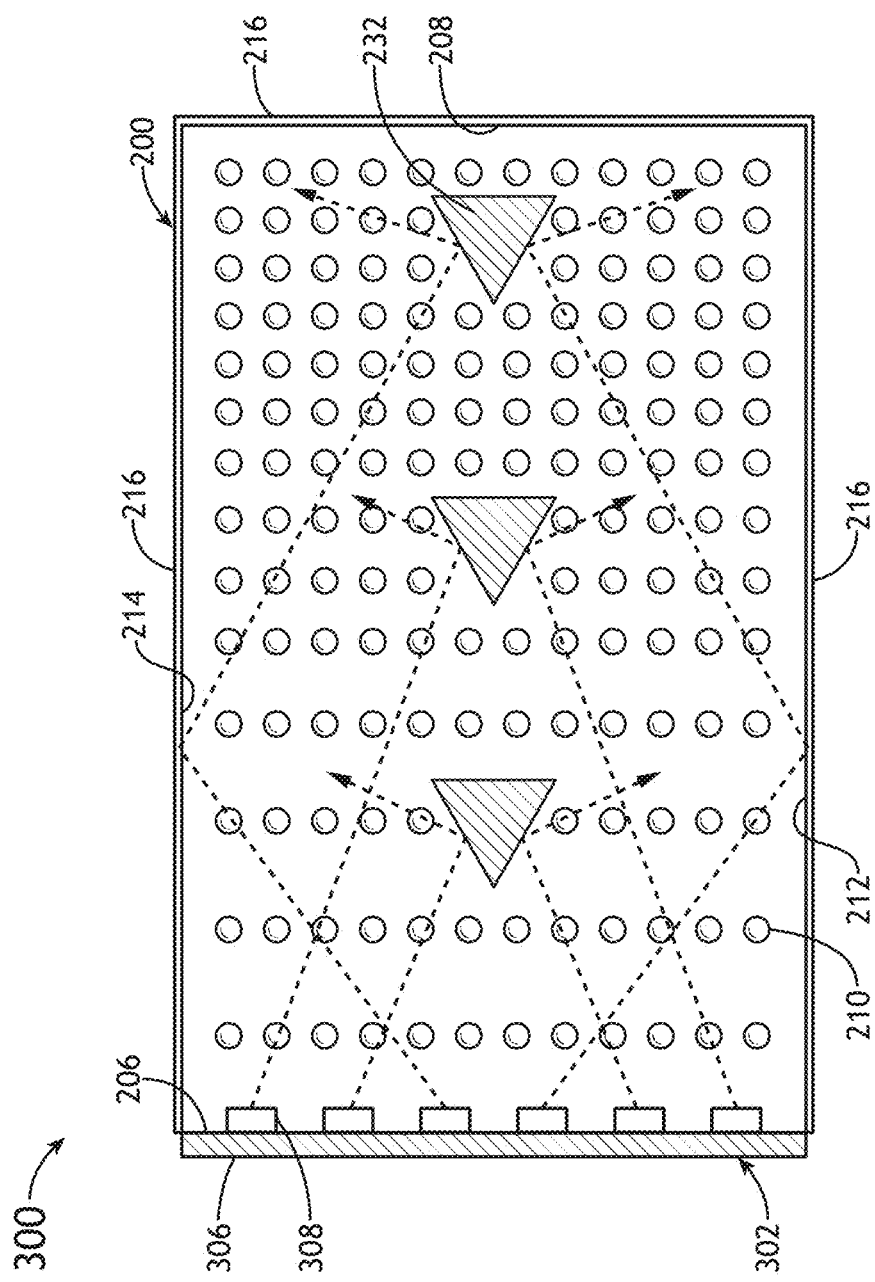
FIG. 13 is a top view of a lighting system that includes a flexible light guide with one or more embedded reflective elements for steering light in accordance with example embodiments of this disclosure.
Figure 14:
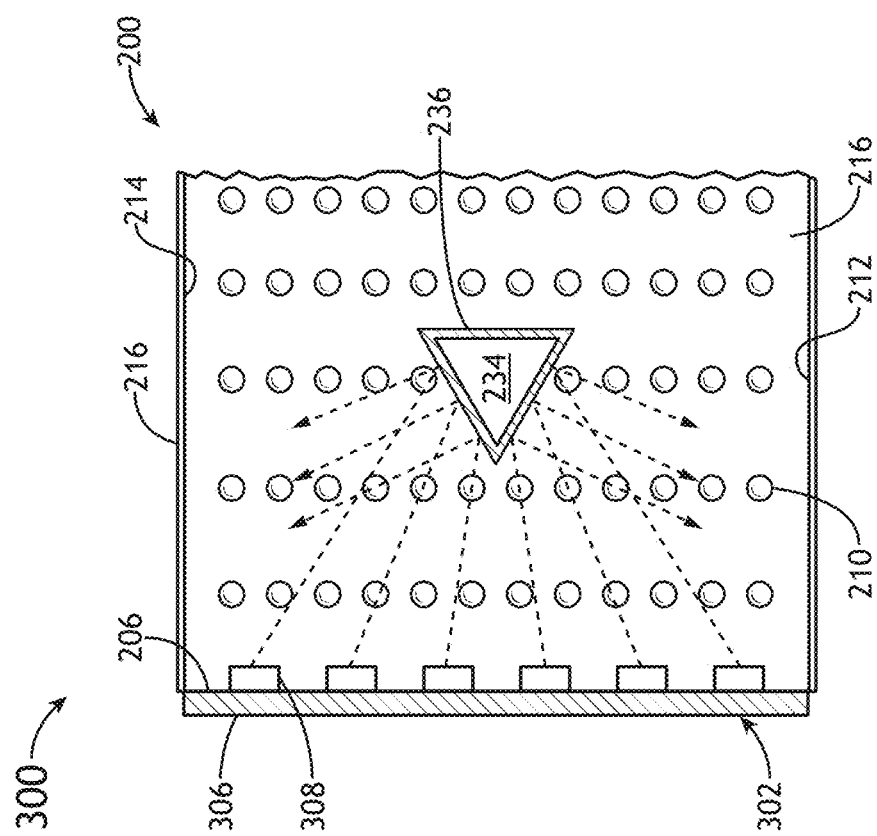
FIG. 14 is a partial top view of a lighting system that includes a flexible light guide with one or more cutout portions for steering light in accordance with example embodiments of this disclosure.

Referring now to FIGS. 12 through 14, the flexible light guide 200 can include one or more light steering features to control the propagation of light in between the two outer surfaces 202 and 204. For example, a light steering feature can be configured to redirect a portion of the light propagating in between the two outer surfaces 202 and 204 when the light at least partially reflects off of the light steering feature. In an embodiment shown in FIG. 12, the one or more light steering features include reflectors 216 (e.g., reflective coating, reflective elements, etc.) disposed upon one or more outer edges (e.g., edges 208, 212, and/or 214) of the flexible light guide 200.

In some embodiments, for example as shown in FIG. 13, the one or more light steering features can include reflective elements 232 embedded within the flexible light guide 200 (e.g., at least partially between the two outer surfaces 202 and 204). Examples of reflective elements 232 can include, but are not limited to, reflective/refractive lenses, prisms, mirrors, or the like. The reflective elements 232 can be formed from one or more materials with different refractive indices than the material (e.g., silicon) of the flexible light guide 200. The reflective elements 232 may be embedded within the flexible light guide 200 during an injection molding process or by removing a portion of the flexible light guide 200 and inserting a reflective element 232 in place of the removed portion.

As shown in FIG. 14, the one or more light steering features can additionally or alternatively include a reflector 236 (e.g., the same as or similar to reflector 216) that is disposed upon at least a portion of an inner edge of a cutout portion 234 of the flexible light guide 200. For example, a portion of the flexible light guide 200 can be removed, leaving a cutout portion 234. The reflector 236 can then be coated, adhered, or otherwise disposed upon the edges surrounding the cutout portion 234.

In some embodiments, one or more light steering features are configured to direct light towards one or more regions of the flexible light guide 200 (e.g., towards the center, away from the center and towards one or more sides, etc.). For example, the light may be directed away from the center and towards the side portions of the flexible light guide 200 if one light source 302 is used to illuminate two signs, where a first sign is formed by a first side portion of the flexible light guide 200 and a second sign is formed by a second side portion of the flexible light guide 200.

Figure 15A:
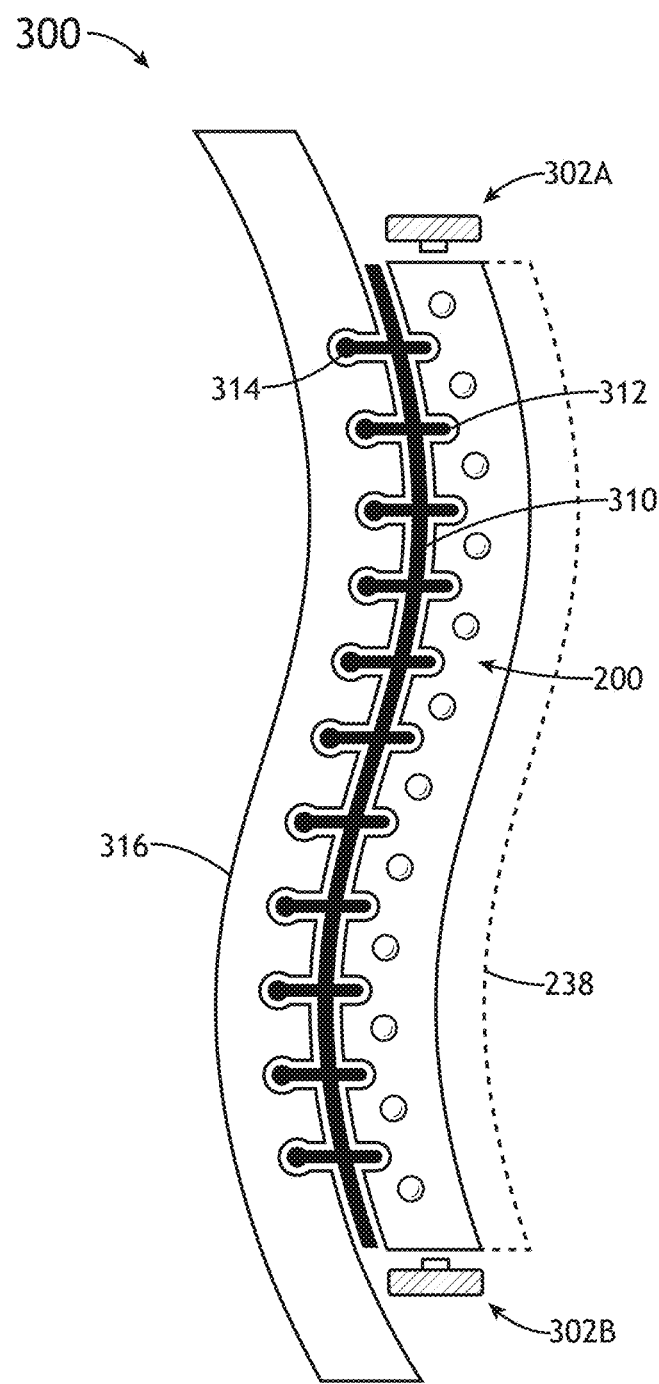
FIG. 15A is a cross-sectional side view of a lighting system that includes a flexible light guide in accordance with example embodiments of this disclosure, where the lighting system includes one or more light fixture components at least partially embedded within the flexible light guide.
Figure 15B:
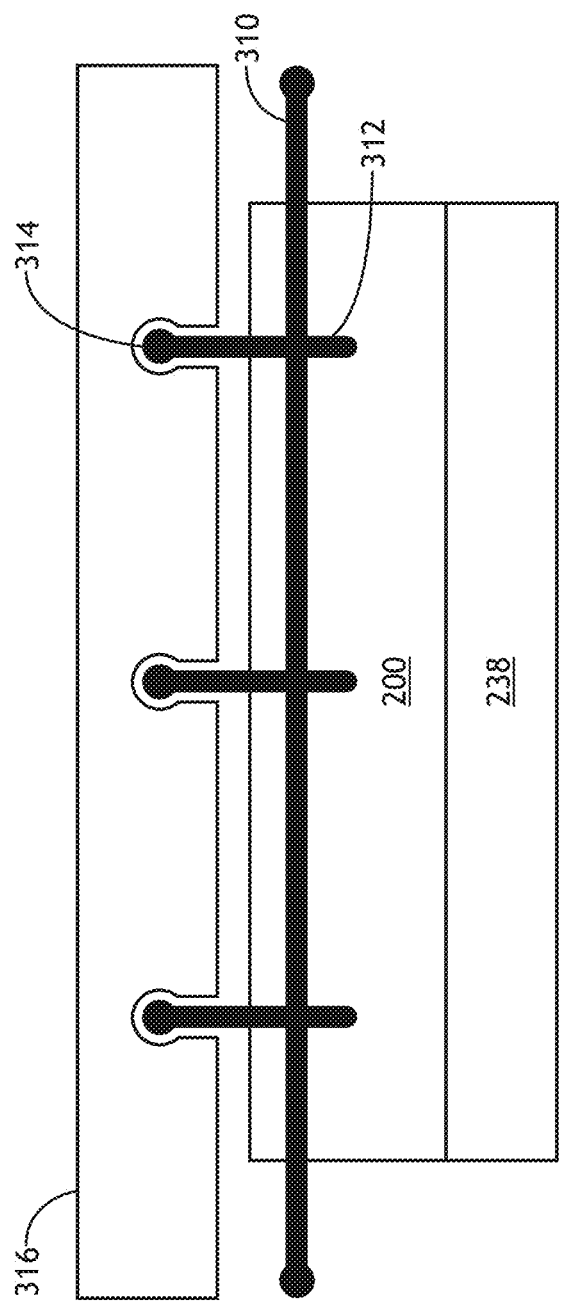
FIG. 15B is a cross-sectional side view of a lighting system that includes a flexible light guide in accordance with example embodiments of this disclosure, where the lighting system includes one or more light fixture components at least partially embedded within the flexible light guide.
Figure 15C:
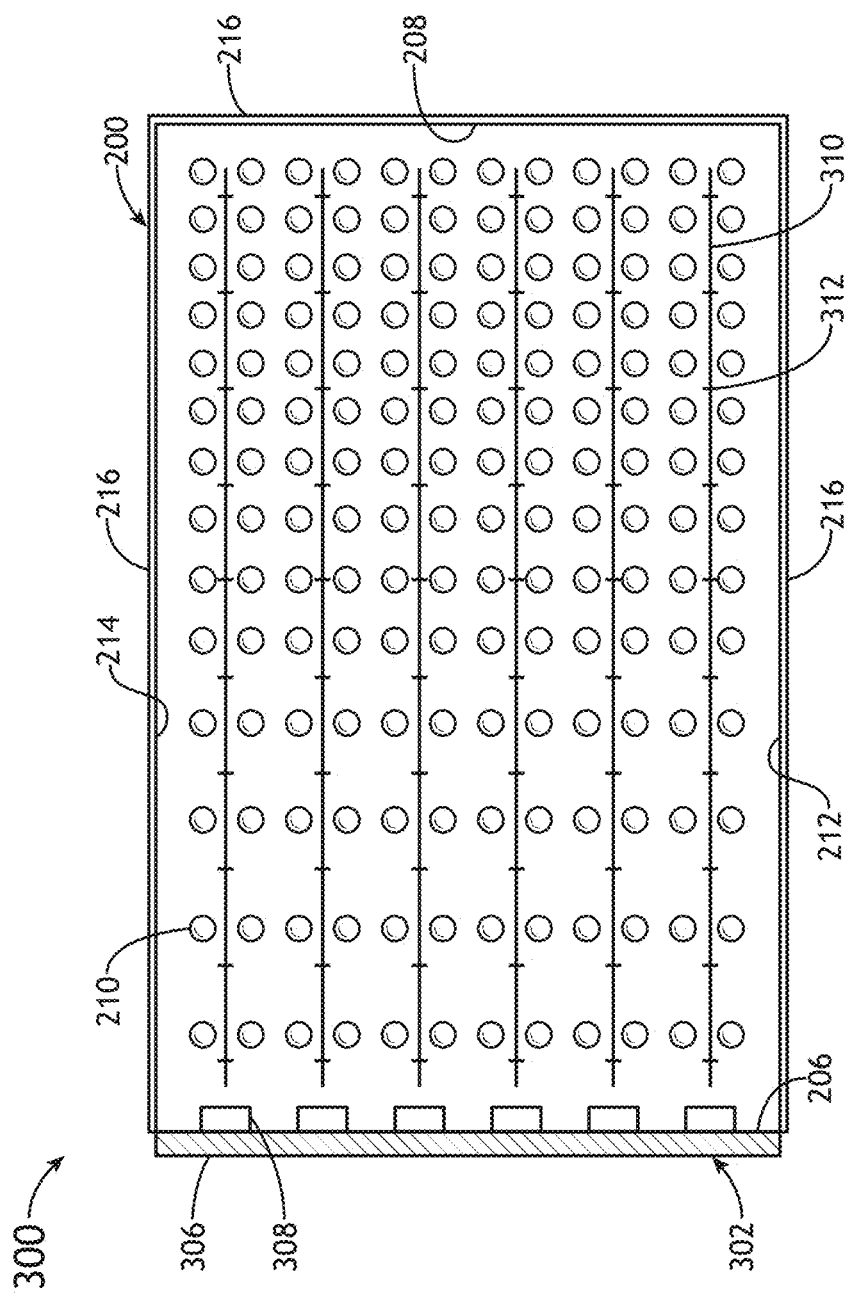
FIG. 15C is a top view of a lighting system that includes a flexible light guide in accordance with example embodiments of this disclosure, where the lighting system includes one or more light fixture components at least partially embedded within the flexible light guide.

In embodiments, the lighting system 300 includes a light fixture system that is configured to support the flexible light guide 200 against a surface for installation (e.g., against the overhead portion 102 of the aircraft 100 in FIG. 1). For example, the light fixture system can be configured to support the flexible light guide 200 against a curved surface, planar surface, angled surface, or any combination thereof. FIGS. 15A through 15C show example embodiments of the lighting system 300 with light fixture system components. The light fixture system includes at least one longitudinal support member 310 with first projections 314 and second projections 312 extending outwardly from the longitudinal support member 310 in opposing directions. The first projections 314 are configured to couple the longitudinal support member 310 with a support surface 316. For example, the first projections 314 may include snap fit connectors (e.g., connector balls or other male/female connectors) that attach the first projections 314 to cooperative snap fit connectors (e.g., connector sockets or other female/male connectors) formed or disposed on/in the support surface 316. The second projections 312 at least partially extend through an outer surface (e.g., outer surface 202) of the flexible light guide 200 to couple the flexible light guide 200 to the support surface 316. In some embodiments, the second projections 312 are embedded within the flexible light guide 200 during an injection molding process or by removing portions of the flexible light guide 200 and inserting the second projections 312 in place of the removed portions. In other embodiments, the second projections 312 may be forced into the flexible light guide 200 (e.g., like nails or spikes).

As shown in FIG. 15C, the lighting system 300 may include a plurality of longitudinal support structures 310 for affixing the flexible light guide 200 to the support surface 316. In some embodiments, the lighting system 300 also includes a plurality of support surfaces 316. For example, the flexible light guide 200 or a plurality of flexible light guides 200 can be fixed along a structure lined with a plurality of support surfaces 316 configured to support the flexible light guide 200 or plurality of flexible light guides 200.

Referring again to FIGS. 15A and 15B, a diffuser 238 may be disposed upon the flexible light guide 200. For example, the diffuser 238 can be formed from a layer (e.g., diffused material layer, such as diffused silicon or the like) on the flexible light guide 200. In some embodiments, the diffuser 238 is a coating disposed upon the outer surface (e.g., outer surface 202 or 204) that defines the light emitting area. In other embodiments, the diffuser 238 is a textured or patterned portion of the outer surface (e.g., outer surface 202 or 204) that defines the light emitting area. In other embodiments, the diffuser 238 is a sheet (e.g., plastic sheet or the like) that is disposed adjacent to the outer surface (e.g., outer surface 202 or 204) that defines the light emitting area. The diffuser 238 can be configured to diffuse the light emitted from the light emitting area to improve uniformity of light emission from the flexible light guide 200.

Figure 16:
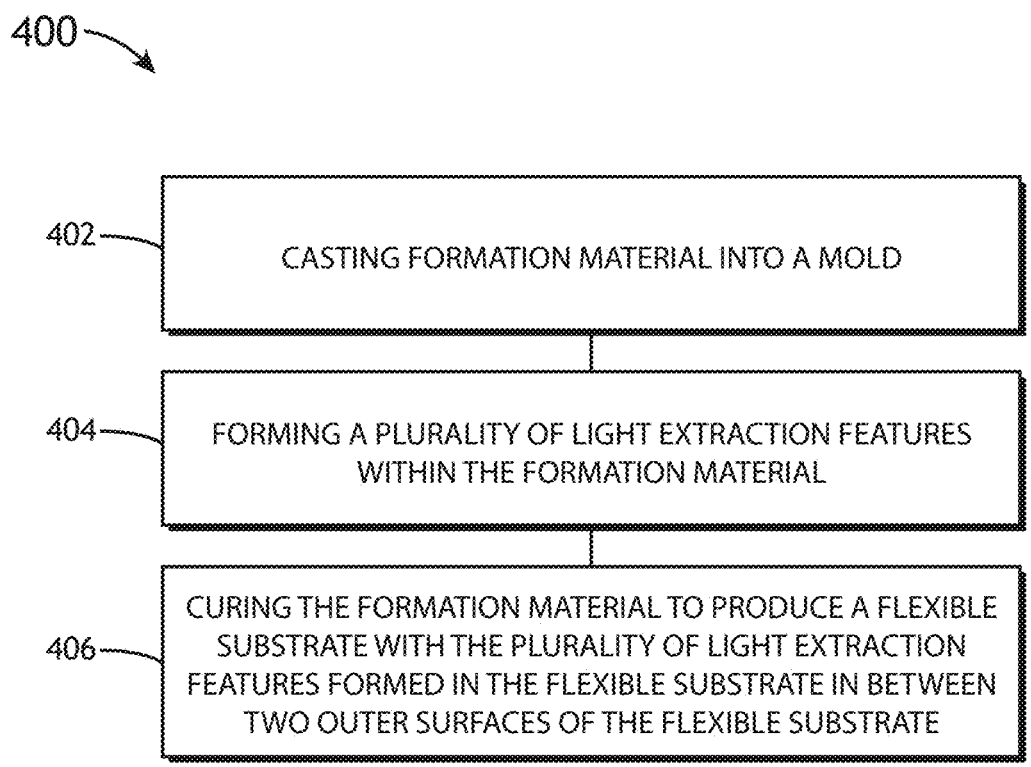
FIG. 16 is a flow diagram illustrating an example implementation of a method for manufacturing a flexible light guide.
Figure 17:
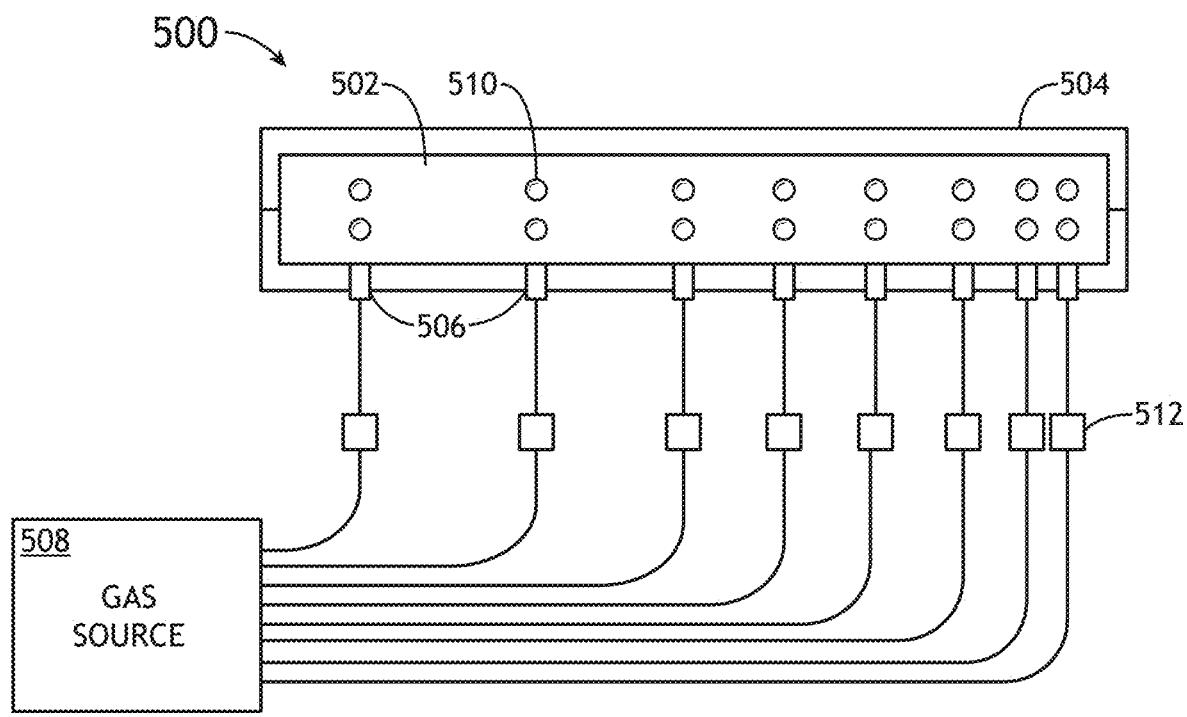
FIG. 17 is a cross-sectional side view of a system for manufacturing a flexible light guide in accordance with example embodiments of this disclosure.
Figure 18:
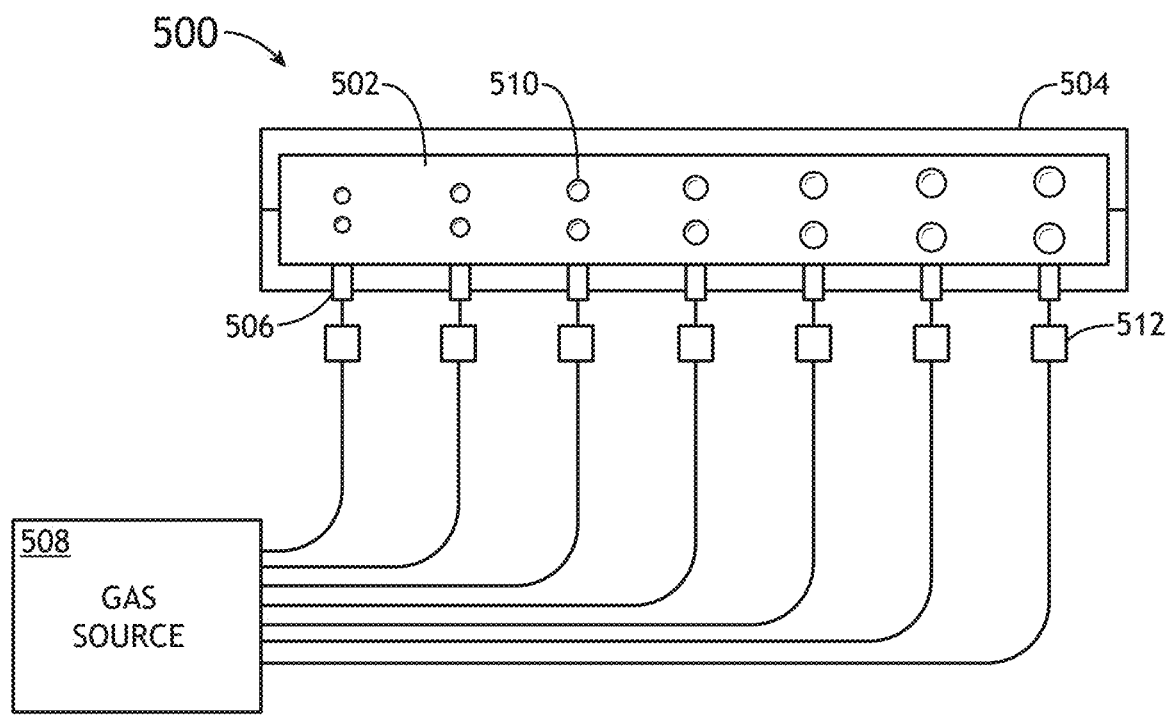
FIG. 18 is a cross-sectional side view of a system for manufacturing a flexible light guide in accordance with example embodiments of this disclosure.
Figure 19:
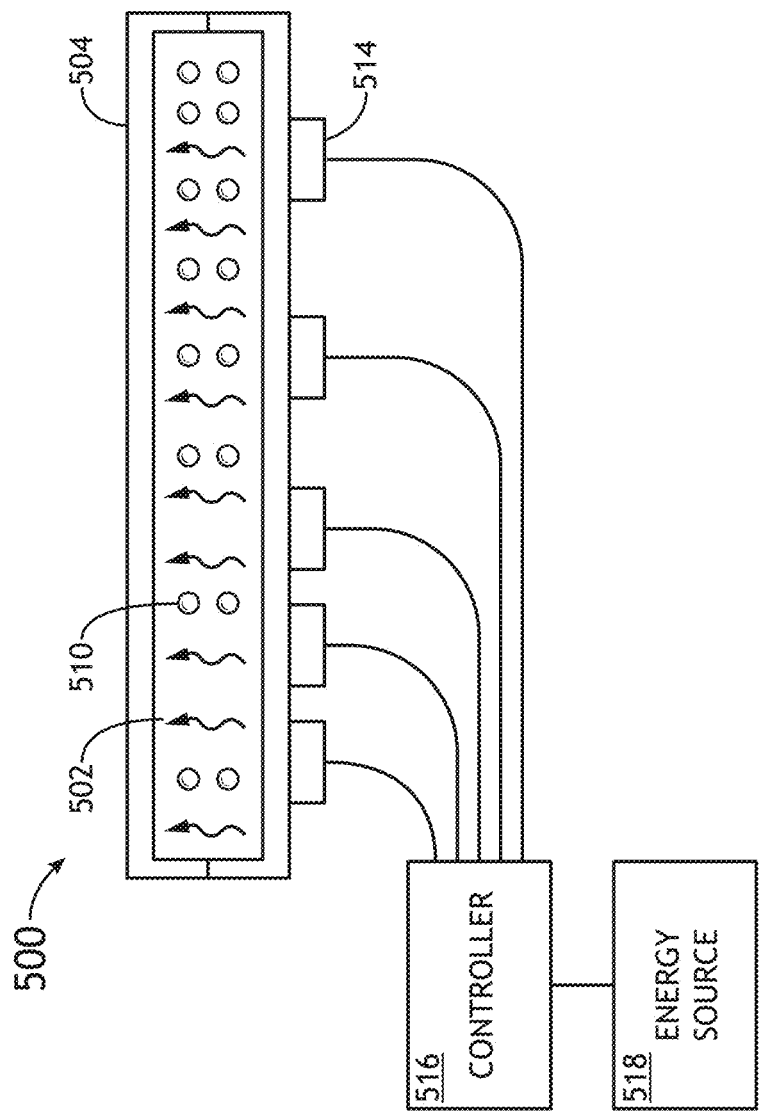
FIG. 19 is a cross-sectional side view of a system for manufacturing a flexible light guide in accordance with example embodiments of this disclosure.

FIG. 16 illustrates an example implementation of a method 400 of manufacturing a flexible light guide, such as the flexible light guide 200 shown in FIGS. 1 through 15C. FIGS. 17 through 19 illustrate example embodiments of a system 500 that can be used to implement the method 400. However, it is contemplated that other tools can also be employed to implement the step, operations, or process blocks of the method 400. In general, operations of disclosed processes (e.g., method 400) may be performed in an arbitrary order, unless otherwise provided in the claims.

The method 400 includes casting formation material (e.g., silicon) into a mold or tool (block 402). For example, as shown in FIGS. 17 through 19, the system 500 can include a mold 504 configured to receive formation material 502 within a cavity defined by the mold 504. In some implementations, the formation material 502 is flowed or injected into the mold 504. For example, the formation material 502 may be injected into the mold 504 at a selected pressure.

The method 400 further includes forming a plurality of light extraction features within the formation material (block 404). For example, as shown in FIGS. 17 through 19, the system 500 can be configured to produce a controlled distribution of light extraction features 510 (e.g., bubbles) within the formation material 502 after the formation material 502 is disposed within the mold 504.

As shown in FIGS. 17 and 18, the light extraction features 510 may be produced by injecting air through pores 506 in the mold 504 after casting the formation material 502 into the mold 504. As used herein, "air" generally refers to any gas or mixture of gases. A gas source 508 (e.g., an air compressor, a pressurized canister, or the like) may be configured to inject air into the formation material 502 through the pores 506 in the mold 504. In some embodiments, the gas source 508 is fluidically coupled to one or more control valves 512 that manage the flow rate of air through the pores 506. As shown in FIG. 17, the pores 506 may be positioned according to the controlled distribution. For example, there may be a higher number of pores 506 in one area than in another area so that, after curing the formation material 502, a first region of the resulting flexible substrate (e.g., flexible light guide 200) has less light extraction features 510 than a second region of the flexible substrate that is configured to be further from the light source (e.g., light source 302) than the first region. In some embodiments (e.g., as shown in FIG. 18), instead of or in addition to varying the number of light extraction features from one region to another, the gas source 508 and/or control valves 512 are configured to inject more air through pores 506 in one area than in another area. Consequently, after curing the formation material 502, a first region of the resulting flexible substrate (e.g., flexible light guide 200) may have smaller light extraction 510 features than a second region of the flexible substrate that is configured to be further from the light source (e.g., light source 302) than the first region.

In some embodiments, the distribution of the light extraction features 510 throughout the formation material 502 is controlled by applying vibrations to the formation material 502 to selectively release bubbles from regions of the formation material 502 after the formation material 502 is cast into the mold 504. For example, as shown in FIG. 19, a plurality of transducers 514 (e.g., piezo electric transducers or the like) can be configured to agitate the formation. In some embodiments, the transducers 514 have a non-uniform distribution. In other embodiments, the transducers 514 are uniformly distributed but controlled according to a non-uniform actuation scheme. The transducers 514 may be coupled to a controller 516 (e.g., micro-controller, processor, programmable logic device, etc.) that is configured to control energy furnished to respective ones of the transducers 514 from an energy source 518 (e.g., electrical outlet, battery, generator, or the like). For example, the controller 516 may be configured to execute an actuation scheme based on program instructions stored in memory of the controller 516. In some embodiments, the system 500 may further include a camera system that monitors the quantity and/or distribution of the light extraction features 510 (e.g., bubbles) and updates the actuation scheme based on detected changes in the quantity and/or distribution of the light extraction features 510.

After producing light extraction features 510 and/or controlling the distribution of the light extraction features 510 in the formation material 502, the formation material 502 is cured to produce a flexible substrate (e.g., flexible light guide 200). For example, the formation material 502 can be cured by allowing the formation material 502 to dry. In some embodiments, the formation material 502 is cured by heating or cooling the formation material 502 to selected temperature. In other embodiments, the formation material 502 is cured by applying electromagnetic radiation (e.g., UV light or another wavelength of illumination appropriate for curing the formation material 502). In other embodiments, the formation material 502 may be cured by applying a curing agent to the formation material 502.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A lighting system, comprising:
   a light source;
   a light fixture, the light fixture including at least one longitudinal support member with first projections and second projections, the first projections configured to couple the longitudinal support member with a curved support surface; and
   a light guide coupled to the light source and the light fixture, the light guide configured to extend along the curved support surface, the light guide including:
      a flexible substrate having two outer surfaces, the two outer surfaces including a first outer surface that defines a light emitting area and a second outer surface that is coupled to the second projections of the light fixture, the second projections at least partially extending through the second outer surface to couple the flexible substrate to the curved support surface;

at least one edge of the flexible substrate configured to receive light from the light source; and a plurality of light extraction features formed within the flexible substrate in between the two outer surfaces, the plurality of light extraction features having a controlled distribution that affects a propagation of light in between the two outer surfaces and an emission of light from the light emitting area.

2. The lighting system of claim 1, wherein the flexible substrate is a flexible silicon substrate.

3. The lighting system of claim 1, wherein the plurality of light extraction features include a plurality of bubbles formed within the flexible substrate.

4. The lighting system of claim 1, wherein the controlled distribution of the plurality of light extraction features is a non-uniform distribution of light extraction features.

5. The lighting system of claim 4, wherein a first region of the flexible substrate has less light extraction features than a second region of the flexible substrate, and the first region is closer to the at least one edge than the second region.

6. The lighting system of claim 4, wherein a first region of the flexible substrate has smaller light extraction features than a second region of the flexible substrate, and the first region is closer to the at least one edge than the second region.

7. The lighting system of claim 1, wherein the at least one edge of the flexible substrate has a first thickness, and an inner portion of the flexible substrate has a second thickness that is less than the first thickness.

8. The lighting system of claim 7, wherein a portion of the flexible substrate in proximity to the at least one edge is tapered from the first thickness to the second thickness.

9. The lighting system of claim 1, wherein the flexible substrate includes at least one light steering feature configured to redirect a portion of the light propagating in between the two outer surfaces when the light at least partially reflects off of the at least one light steering feature.

10. The lighting system of claim 9, wherein the at least one light steering feature comprises a reflector disposed upon at least a portion of an outer edge of the flexible substrate.

11. The lighting system of claim 9, wherein the at least one light steering feature comprises a reflective element embedded within the flexible substrate so that at least a portion of the reflective element is in between the two outer surfaces of the flexible substrate.

12. The lighting system of claim 9, wherein the at least one light steering feature comprises a reflector disposed upon at least a portion of an inner edge of a cutout portion of the flexible substrate.

\* \* \* \* \*